Dec. 6, 1949  F. J. FURMAN  2,490,346
RECORD CARD SENSING DEVICE
Filed July 9, 1948

Inventor
FRANK J. FURMAN
BY William Lang
Attorney

Patented Dec. 6, 1949

2,490,346

UNITED STATES PATENT OFFICE 2,490,346

RECORD CARD SENSING DEVICE

Frank J. Furman, Endicott, N. Y., assignor to International Business Machines Corporation, New York, N. Y., a corporation of New York Application July 9, 1948, Serial No. 37,811

2 Claims. (Cl. 235—61.11)

This invention relates to devices for sensing perforation receiving positions in record cards or documents for the purpose of detecting the presence or absence of perforations in such positions.

The principal object of the invention is to provide an improved perforation sensing element which, when brought into sensing registration with a perforation receiving position of a record, will respond to a perforation accurately registered in such position and also to a perforation that may be out of registration by a greater extent than has heretofore been permissible in such devices.

In carrying out the object of the invention, there is provided a pair of sensing pins arranged for movement into engagement with a delimited area on the surface of a record. The contacting ends of the pins are spaced apart end, if a perforation is accurately located within the area, both pins will pass therethrough. If the perforation is displaced to one side or the other within limits, one or the other of the pins will pass through and the second will be intercepted by the surface of the record. The two pins are arranged to actuate a common interposer so that, if either or both pass through the perforation, the interposer will be shifted and thereby control a circuit closing device.

Other objects of the invention will be pointed out in the following description and claims and illustrated in the accompanying drawings, which disclose, by way of example, the principle of the invention and the best mode, which has been contemplated, of applying that principle.

Figure 1:
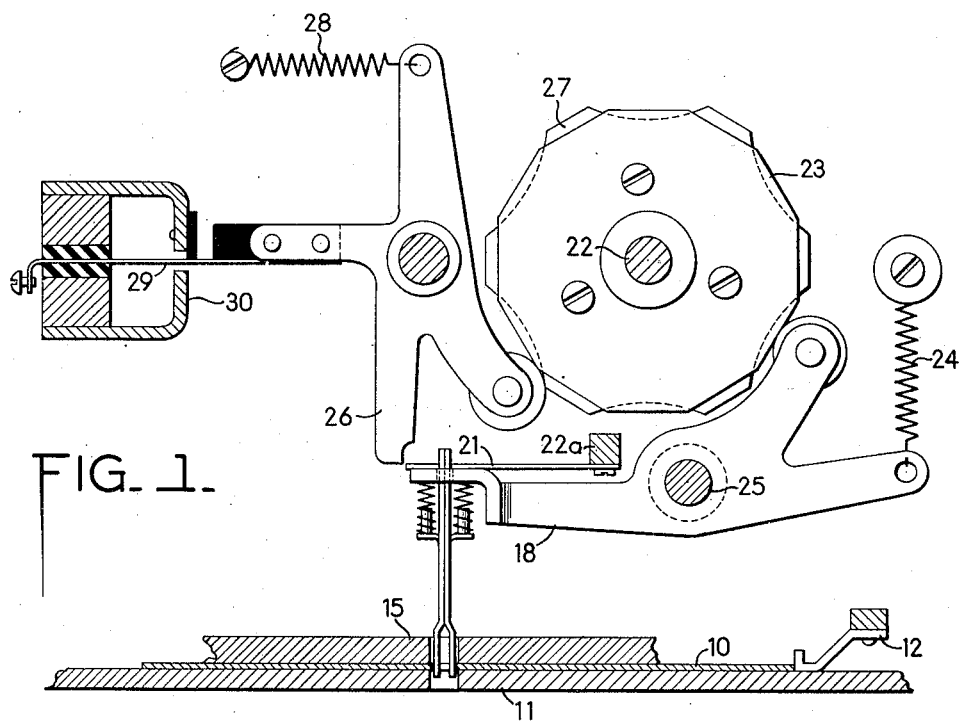
Fig. 1 is a general view showing the relation ship between sensing pins and a record card.

Referring to Fig. 1, 10 represents a record card which is advanced along a bed plate 11 by a pusher 12 in a well known manner to present successive positions or areas in registration with the sensing device. Such device comprises a pair of pins 13 and 14 guided in block 15 for vertical reciprocation. Tabs 16 (Fig. 2) bend outwardly from the pins and support springs 17 which at their upper ends bear against the under side of a bail 18, so that the pins are normally biased in a downward direction. The bail 18 has an opening 19 through which the pins extend.

Figures 2, 3:
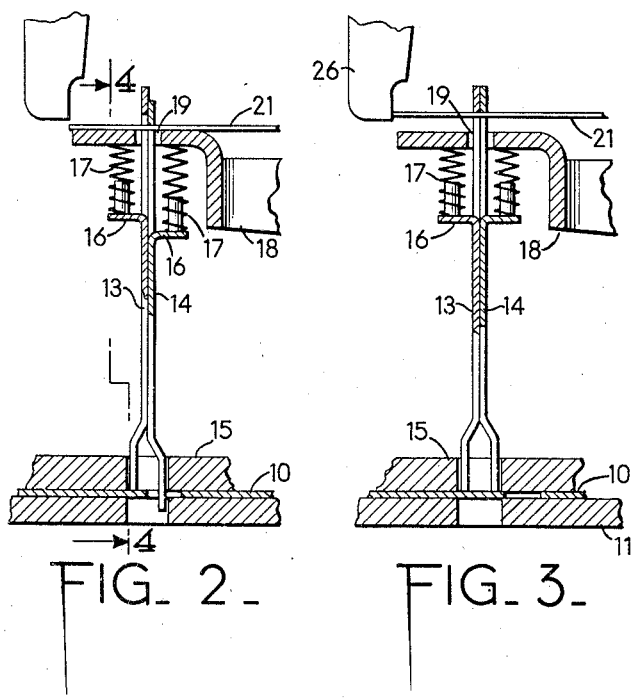
Fig. 2 is an enlarged detail showing the sensing pins in sensing position with a hole in a record out of exact registration.
Fig. 3 is a similar view with the perforation completely out of registration.
Figure 4:
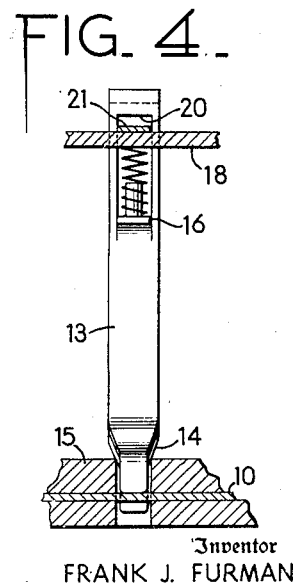
Fig. 4 is a sectional view looking in the direction of line 4—4 of Fig. 2.

As shown in Fig. 4, the pins are provided with openings 20 through which an interposer 21, in the form of a leaf spring anchored at 22a, passes. This leaf spring is adjusted to bear upwardly against the upper edges of the openings 20. With a record card in position as in Fig. 1, the shaft 22 is rotated and under control of a cam 23 and a spring 24 follower bail 18 is rocked counterclockwise about its pivot 25. In doing so it will press against the springs 17 as shown in Figs. 2 and 3 to urge the pins 13, 14 against the record card 10. If at such time there is no perforation in line with the pins, their lower ends will be intercepted by the record as shown in Fig. 4, so that the parts assume the positions shown, where the interposer 21 remains in its upper position.

Where the perforation is in line with one of the pins such as pin 14, for example, that pin will descend through the perforation under the influence of its compressing spring 17 and, through engagement of the upper edge of its opening 20 with interposer 21, it will draw the latter down to the position of Fig. 3. It is apparent that this same action will occur if the other pin 13 were to descend through a perforation or if both pins did so.

The interposer 21 in its normal position of Fig. 1 has its left end lying in the path of movement of a finger 26. Through a cam 27 on shaft 22 finger 26 is rocked counter-clockwise under the influence of spring 28 shortly after bail 18 has been rocked. If one or both of the pins has entered a perforation, the interposer will have been drawn downwardy to the position of Fig. 3, so that finger 26 may rock and cause a contact blade 29 to engage a contact element 30 to complete a circuit for controlling well known current responsive devices. If, when finger 26 attempts to rock, the interposer is in the position of Fig. 4, closure of the contacts 29, 30 is prevented. It is thus seen from Figs. 2 and 3 that the perforation in the record may vary in its location with respect to the sensing pins a considerable distance to the right and left. As long as it overlaps at least one of the pins, the interposer 21 will be drawn down to permit closure of the contacts.

It is to be noted that bail 18, upon its upward or return stroke, will engage and effect positive restoration of pins 13, 14 and also interposer 21.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A sensing device for sensing a perforation receiving position of a record, which position constitutes a delimited area in which a perforation may be made, comprising a plurality of pins guided for movement in a direction perpendicular to the surface of the record and having their ends spaced apart a distance greater than one-half the width of said area, and less than the entire width, an operating bar, means for reciprocating the same, spring means between the bar and pins acting during the stroke of the bar to urge the pins against the surface of the record, an interposer passing through an opening in each of said pins arranged so that any one of the pins upon passing through a perforation will move the interposer from a normal to an active position, said bar acting during its return stroke to restore the interposer and therethrough restore the pins.

2. A sensing device for sensing a perforation receiving position of a record, which position constitutes a delimited area in which a perforation may be made, comprising a plurality of pins guided for movement in a direction perpendicular to the surface of the record and having their ends spaced apart a distance greater than one-half the width of said area, and less than the entire width, resilient means acting separately upon the said pins to urge them against the surface of the record, to cause a pin in line with a perforation to pass therethrough, said resilient means yielding where a pin engages an imperforate part of said card surface, an interposer common to all the pins and coordinated therewith so that movement of any pin through a perforation will shift the interposer, a normally ineffective machine control device, and means controlled by the interposer upon shifting for rendering the said device effective.

FRANK J. FURMAN.

No references cited.